(12) United States Patent
Groh et al.

(10) Patent No.: US 10,007,278 B2
(45) Date of Patent: Jun. 26, 2018

(54) PNEUMATIC VALVE AND USE THEREOF FOR A CONNECTED CONSUMER

(75) Inventors: Christian Groh, Gersheim (DE); Kai Remus, Ottweiler (DE)

(73) Assignee: HYDAC ELECTRONIC GMBH, Saarbruecken (DE)

( * ) Notice: Subject to any disclaimer, the term of this patent is extended or adjusted under 35 U.S.C. 154(b) by 942 days.

(21) Appl. No.: 13/261,762

(22) PCT Filed: Feb. 28, 2012

(86) PCT No.: PCT/EP2012/000843
§ 371 (c)(1),
(2), (4) Date: Nov. 14, 2013

(87) PCT Pub. No.: WO2012/146332
PCT Pub. Date: Nov. 1, 2012

(65) Prior Publication Data
US 2014/0061520 A1 Mar. 6, 2014

(30) Foreign Application Priority Data
Apr. 28, 2011 (DE) .......................... 10 2011 018 873

(51) Int. Cl.
*G05D 16/20* (2006.01)
*F16K 31/06* (2006.01)

(52) U.S. Cl.
CPC ....... *G05D 16/202* (2013.01); *F16K 31/0658* (2013.01); *G05D 16/2013* (2013.01); *Y10T 137/87917* (2015.04)

(58) Field of Classification Search
CPC .............. G05D 16/2013; G05D 16/202; Y10T 137/87917; F16K 31/0658
(Continued)

(56) References Cited

U.S. PATENT DOCUMENTS 3,075,545 A      1/1963   Eichelman
5,271,430 A * 12/1993   Muruyama ............... F16K 3/24
                                                                 137/484.4
(Continued)

FOREIGN PATENT DOCUMENTS

DE        22 22 447 A1     11/1973
DE        31 24 904 A1      5/1982
(Continued)

*Primary Examiner* — Logan Kraft
(74) *Attorney, Agent, or Firm* — Wenderoth, Lind & Ponack, L.L.P.

(57) ABSTRACT

A pneumatic valve, in particular a pneumatic proportional pressure control valve includes a valve housing (3), in which a piston valve element (5) is guided in a guide (7) under the effect of an actuating device (9) and of a restoring device (11). The restoring device exerts a spring force and acts on the valve element (5) counter to the applied magnetic force (FB) of the actuating device (9). The valve element controls a media flow between a first media connection (13) and a second media connection (15) on the valve housing (3). With the actuating device (9), the valve element (5) establishes a media-conducting connection (17) between the respective media connections (13, 15), while allowing for the forces prevailing, on the basis of the applied pressures multiplied by the respective pressure-active surfaces, the spring force, the flow forces and the magnetic force.

21 Claims, 4 Drawing Sheets

(58) Field of Classification Search
USPC .......................................................... 60/410
See application file for complete search history.

(56) References Cited

U.S. PATENT DOCUMENTS

| 6,874,751 | B2 * | 4/2005 | Ojima | ................ | G05D 16/2013 |
| | | | | | 251/129.14 |
| 2002/0185112 | A1 * | 12/2002 | Lei | ........................ | F02M 45/04 |
| | | | | | 123/446 |

FOREIGN PATENT DOCUMENTS

| DE | 33 28 418 A1 | 2/1985 |
| DE | 100 25 772 A1 | 11/2001 |
| EP | 0 357 964 A2 | 3/1990 |
| GM | 80 27 421 | 2/1981 |

* cited by examiner

PNEUMATIC VALVE AND USE THEREOF FOR A CONNECTED CONSUMER

FIELD OF THE INVENTION

The invention relates to a pneumatic valve, in particular a pneumatic proportional pressure control valve, having a valve housing, in which a piston valve element is guided in a guide in an axially displaceable manner and regulating a media flow at least between at least a first media connection and a second media connection on the valve housing under the effect of an actuating device for the valve element and of a reset device. The reset device exerts a spring force and acts on the valve element counter to the applied magnetic force of the actuating device.

BACKGROUND OF THE INVENTION

Systems that conduct pneumatic fluids have different valves for the monitoring and control of the pressure of those systems. For example, valves are used to adjust the pressure in a pneumatic system or in parts of a system of this kind, which regulate or reduce the pressure at the pressure input or output side thereof. Pressure relief valves are used in pneumatic systems of this kind to limit the pressure. The pressure relief valves may also have a fluid-conducting connection from a pressure line to a pressure accumulator. A pneumatic valve of this kind typically has a valve housing. The valve housing comprises at least a first media connection and a second media connection, which frequently form a media inlet port and a media outlet port. Often a piston valve element is guided in a guide in the valve housings of a pneumatic valve in an axially displaceable manner. A cross-sectional area of flow between the first media connection and the second media connection can be modified by an axial movement of the piston valve element, for example. Here, the piston valve element is preferably moved by an actuating device in one direction and by a reset device in the other direction. In this way, for example, the pressure at either one or the other media connections can be regulated and reduced.

DE 10 2009 010 339 A1 describes a proportional control valve for pneumatic applications, comprising a valve element that can be piezoelectrically activated, a sensor for measuring an actual value of a control variable, an electrical interface for receiving a control signal representing the target value for the control variable, as well as control electronics. The electrical interface is a 2-wire interface for receiving a pulse-width modulated, digital control signal. The proportional control valve is also configured to obtain the total electrical energy for operating the proportional control valve from the digital control signal.

The known pneumatic valves have electronically activated actuating devices, which are preferably activated in accordance with sensor signals of one or more valve-internal pressure sensors. In particular, the known proportional control valves are complex in structure, which complexity is associated with high manufacturing and assembly costs. The control electronics in particular have proven to be prone to frequent failure, in particular under "heavy operating conditions".

SUMMARY OF THE INVENTION

An object of the invention is to provide an improved pneumatic valve, which is easy to assemble and inexpensive to manufacture, and which functions reliably when in operation. An additional object of the invention is to provide pressure control for a pneumatic medium for a device connected to one or more of these valves with the aid of the pneumatic valve.

These objects are basically achieved by a pneumatic valve and by a use of at least two valves according to the invention.

The valve according to the invention, with the activation of the actuating device, has a valve element that establishes a media-conducting connection between respective media connections, while taking into account the prevailing forces, on the basis of the applied pressures multiplied by the respective pressure-active surfaces, the spring force, the flow forces and the magnetic force. In the case of a change in the media pressure in at least one of the media connections, the valve element can be moved either into a closed position, or into a position in which an opening cross section of the media connection controlled by the valve element is increased.

In an especially preferred embodiment of the pneumatic valve, in which a pneumatic valve is used as a pressure-reducing valve, the lower pressure is regulated inasmuch as, in the case of a media connection, a higher pressure is present as compared to a lower pressure in the other respective media connection. In the case of the control of the respective higher pressure, the function of a pressure relief valve can preferably be realized by the same valve design. A design feature is thereby provided that combines two functions in the same pneumatic valve depending on the allocation of the connections, that of a pressure-reducing valve and that of a pressure relief valve.

In the case of the operation of the pneumatic valve according to the invention without activating the actuating device, the valve element is held toward the closed position thereof by the applied magnetic force of the reset device according to the following formula:

$$(p_1 \times A_1) - (p_2 \times A_2) + (p_2 \times A_3) - (p_2 \times A_4) + F_O = 0$$

Here, $p_1$ is understood to be a media pressure at the first media connection, $p_2$ is understood to be a media pressure at the second media connection, while $A_1$ to $A_4$ are understood to be individual pressure-active surfaces on the piston-like valve element and $F_O$ is understood to be a spring force of the reset device on the valve element. The formula specified above expressed the ratios without taking into account friction. A media pressure $p_1$, $p_2$ applied respectively to at least of the media connections, multiplied by a pressure-active surface $A_1$, $A_2$, $A_3$, $A_4$ of the valve element is preferably in equilibrium with the prevailing actuating force $F_B$ of the actuating or magnetic force.

The valve element is preferably formed by a valve piston having a thickened cross section. The valve piston has a cross-sectionally widened valve head at the free end thereof. The valve head protrudes from the valve housing. The first media connection reaches through and is connected to the valve piston by the rod. The valve is closed while currentless. Thus a valve piston and a valve head are combined in the valve element. This design feature reduces the assembly effort for the pneumatic valve according to the invention. The valve head, in turn, has a pressure-active surface on each of the two opposing ends thereof. This design feature also demonstrates a multiple use of a component, here in the form of the valve element of the pneumatic valve.

In an especially preferred exemplary embodiment of the pneumatic valve, an end of the valve piston, which faces the second media connection, is formed as a pressure-active surface, which is the same size as the pressure-active surface on the valve head. An additional pressure-active surface is formed on the other end of the valve piston, with that pressure-active surface preferably being larger than each of the aforementioned, individual pressure-active surfaces. This design feature can reduce the force of the actuating device needed to activate the valve element, and therefore, reduce the overall size of the actuating device.

The actuating device is preferably formed by an actuating magnet, having an armature guided in an armature housing, preferably within a pole tube, in a longitudinally displaceable manner. The armature is controlled by an energizable solenoid device. The armature can move the valve element from the closed position into an opened position counter to the reset force or spring force of preferably at least one compression spring of the reset device.

In a first embodiment of the pneumatic valve, the valve piston of the valve element is guided with a running tolerance in the guide of the valve housing, in order to produce a pressure equalization between the two media connections and the armature housing of that sort. In an additional exemplary embodiment of the pneumatic valve, the guide of the valve piston in the valve housing is designed to be air-tight to the effect that the armature housing is maintained in the range of the ambient pressure with a pressure-tight design vis-à-vis the surroundings. In an additional exemplary embodiment of the pneumatic valve, in the case of a valve piston that is guided in the valve housing in an air-tight manner, the armature housing is equalized to the ambient pressure by at least one venting duct. This design feature allows the reset device to have especially small dimensions, since overall, the valve piston is pressure-compensated.

At least two of the pneumatic valves according to the invention can be advantageously used to control the pressure of a pneumatic medium for a device that is connected to each of the valves in question. Advantageously, one valve is used or formed as a pressure-reducing valve, and the other valve is used or formed as a pressure relief valve. The device may be a pneumatic working cylinder for example. The media chambers of the pneumatic working cylinder are located in a cylinder housing, are separated from one another in a known manner by a piston-rod assembly. Both the pressure-reducing valve and the pressure relief valve are connected to one of the two media chambers of the working cylinder, preferably with a design identical to that of the pressure-reducing valve.

The pneumatic valve thus combines at least two different functions in a single design, that of a pressure-reducing valve and that of a pressure relief valve. It functions without the use of electronic control devices such as pressure sensors and the signal processing CPUs (processors) thereof. In this way, the pneumatic valve according to the invention has a very simple and compact design, and is suitable for performing different control functions of a pneumatic system. By foregoing complicated control electronics, as disclosed in the prior art, an especially fail-safe operation can be achieved even if the valve is subjected to "heavy operating conditions".

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
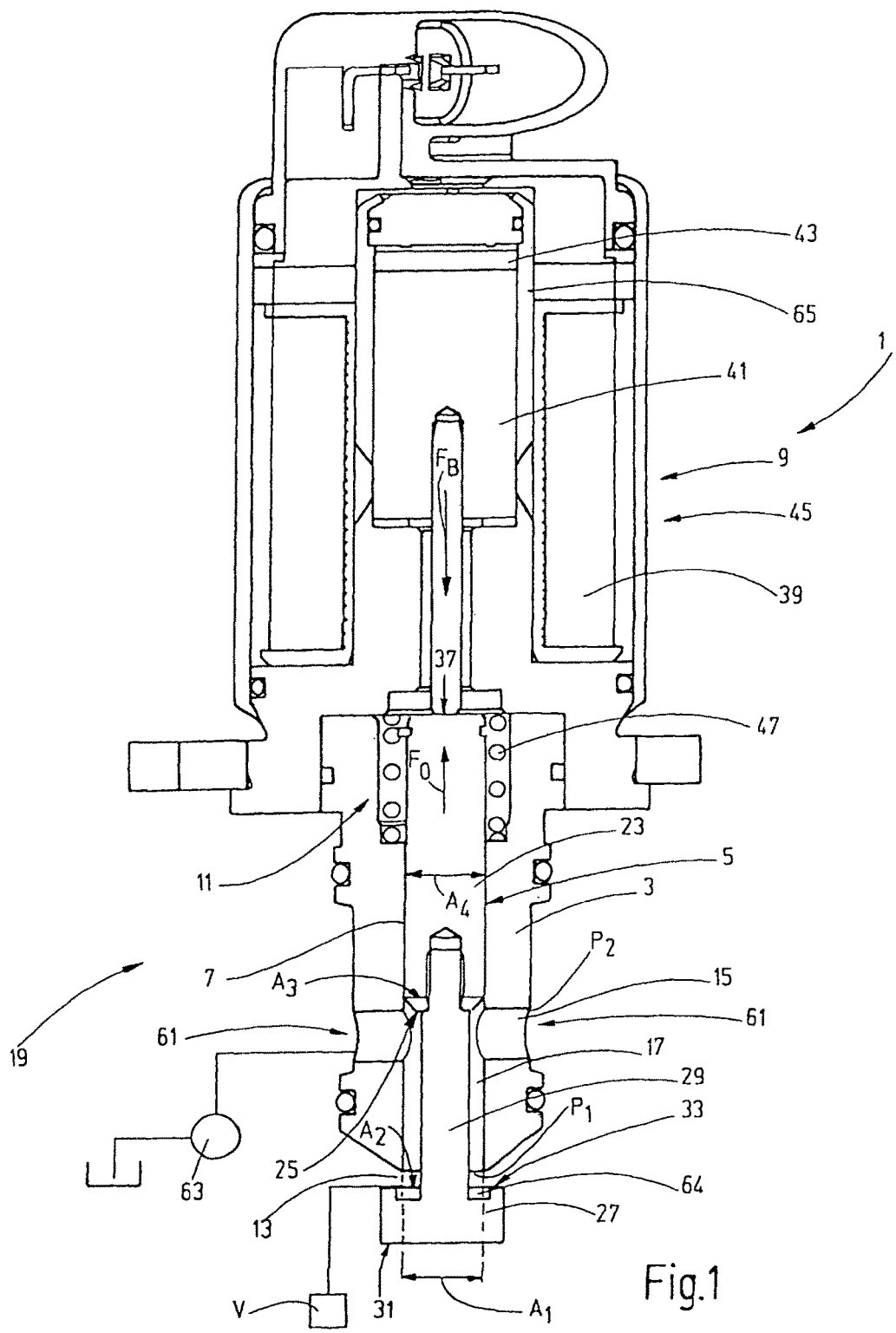
FIG. 1 is a schematic side view in section, not to scale, of a pneumatic valve functioning as a pressure-reducing valve (DMV), according to a first exemplary embodiment of the invention.

FIG. 1 shows a schematic longitudinal section through a pneumatic valve 1, not to scale, which is formed as a pneumatic proportional pressure control valve in the exemplary embodiment shown. The pneumatic valve 1 has a valve housing 3 having a cylindrical form. A piston valve element 5 is guided in a guide 7 in the valve housing 3 in an axially displaceable manner. The guide 7 is designed in the manner of a valve body bore in the exemplary embodiment shown. The piston valve element 5 is driven axially therein in either one direction or the other direction, under the effect of an actuating device 9 and of a reset device 11. Reset device 11 acts on the valve element 5 having a force $F_O$ counter to the applied force $F_B$ of the actuating device 9. All of the pressure-active surfaces are included such that in any event, a proportional pressure control valve is realized, and not a proportional throttle valve. In this case, the piston-like valve element 5 controls a media flow between a first media connection 13 and a second media connection 15 on the valve housing 3. In the exemplary embodiments shown in FIGS. 1 to 4, the valves 1 of that sort control a media flow in the form of pressurized air.

In the exemplary embodiment shown, the first media connection 13 is disposed centrally on an axial end of the valve housing 3 forming a circular opening. Upon the activation of the actuating device 9, which is formed as an energizable solenoid device 45 in all of the exemplary embodiments shown, the valve element 5 establishes a media-conducting connection 17 between the first media connection 13 and the second media connection 15. In so doing, an equilibrium arises between the prevailing actuating force $F_B$ of the actuating device 9 and the forces on the valve element 5 in such a way that the media pressures $p_1$, $p_2$ applied respectively to the media connections 13, 15 multiplied by the respective pressure-active surfaces $A_1$ to $A_4$, the spring force and the flow forces are in equilibrium with the respective actuating force $F_B$. A further explanation of the equilibrium situation of that sort in the exemplary embodiments of the pneumatic valves 1 shown is provided below.

Figure 2:
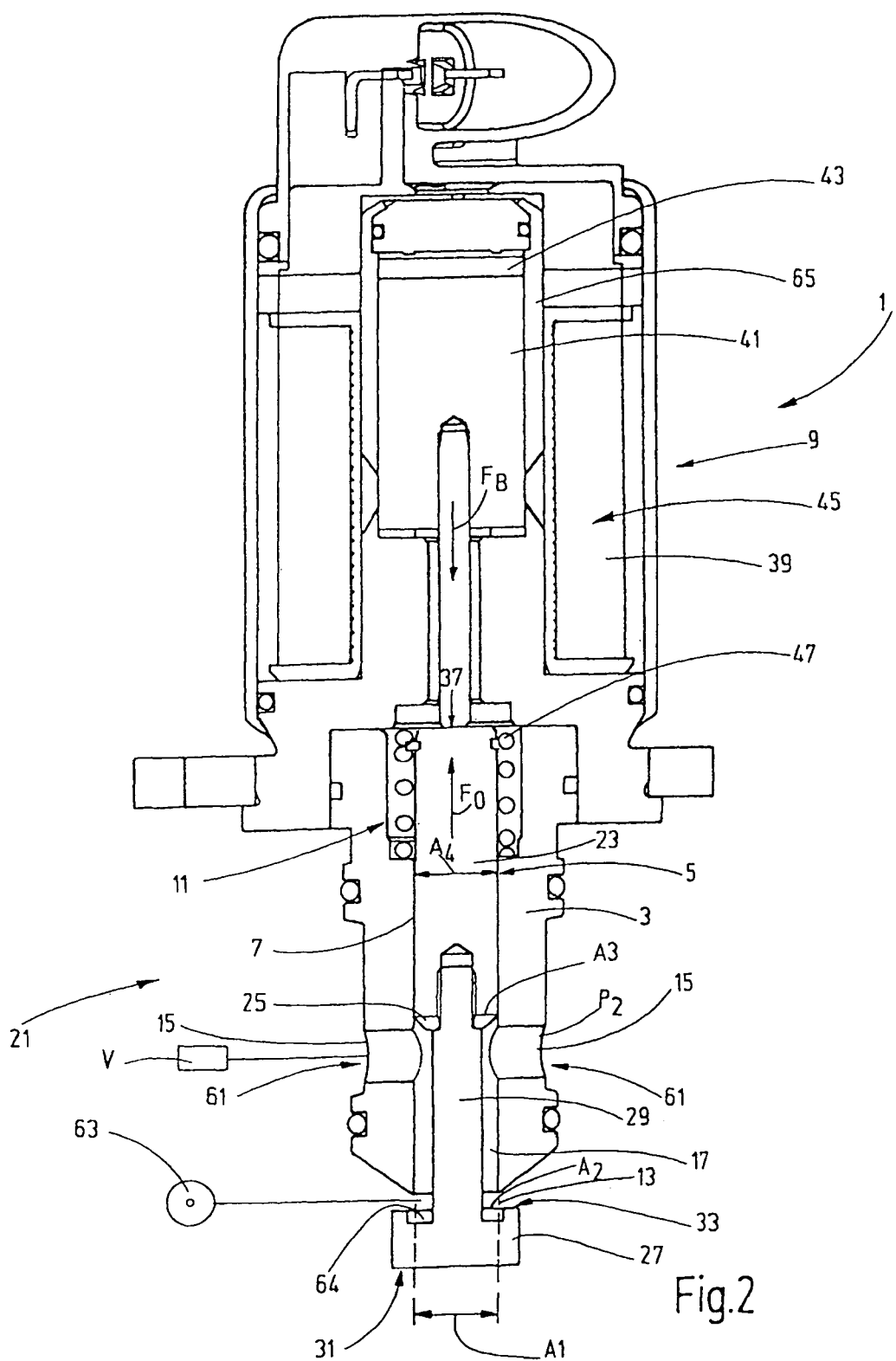
FIG. 2 is a schematic side view in section through a pneumatic valve, not to scale, functioning as a pressure relief valve (DBV) according to the first exemplary embodiment of the invention.

The pneumatic valve 1 may be used as a pressure-reducing valve 19 (cf. FIG. 1) or as a pressure relief valve 21 (cf. FIG. 2). Accordingly, in FIG. 1 a pressure source 63 having, for example, a constant pressure is connected to the second media connection 15 formed by diametrically opposing bores 61 and extending radially to the guide 7 in the valve housing 3. Ambient pressure may prevail in particular at the pressure source 63. A device V is connected to the first media connection 13. Here, the pneumatic valve 1 regulates the pressure at the first media connection 13, which is generally lower.

In the pneumatic valve 1, shown in FIG. 2 as a pressure relief valve 21, the pressure source 63 is connected to the first media connection 13, and a device V is connected to the second media connection 15. Here, the valve element 5 limits the applied pressure with the device V at the second media connection 15. Otherwise, the same reference numbers apply for the same components as in FIG. 1.

In the case of the operation of the pneumatic valve 1 without activating the actuating device 9, the valve element 5 is held towards the closed position thereof by the applied force $F_O$ of the reset device 11. An equilibrium of forces exists as follows:

$$(p_1 \times A_1) - (p_2 \times A_2) + (p_2 \times A_3) - (p_2 \times A_4) + F_O = 0$$

Here, $p_1$ is defined as the pressure at the first media connection 13, while $p_2$ is defined as the pressure at the second media connection 15. The definition of the pressure-active surfaces $A_1$ to $A_4$ on the piston-like valve element 5 is shown below. The valve element 5 is formed by a valve piston 23, which is guided in the guide 7 of the valve housing 3, and a valve head 27 connected therewith. The valve piston 23 is formed cylindrically and provided with a thickened cross-section, and has a free end 25, at which the valve head 27, the cross section of which is further widened, protrudes from the valve housing 3, with the first media connection 13 reaching through. The valve head 27 is connected to the valve piston 23 by a valve rod 29. In the exemplary embodiment shown in FIGS. 1 and 2, the valve rod 29 is connected to the valve piston 23 by a screw connection.

The pressure-active surface $A_1$ is a partial area of the overall area of the valve head 27, and is disposed on an end 31 of the valve head 27, which end faces away from the valve housing 3. The pressure-active surface $A_2$ is formed on the end 33 that faces away from end 31. The pressure-active surface $A_1$ is identical to the surface $A_4$. The pressure-active surface $A_1$ corresponds to the diameter of the valve housing bore in the region of the media connection 13. The surface $A_2$ corresponds to the surface $A_1$ minus the diameter of the valve rod 29. The figures each represent a non-steady state. The valve is closed in the steady state or when it is in a non-energized state.

The valve piston 23 has an additional pressure-active surface $A_3$ at the end 25 thereof facing towards the second media connection 15. The pressure-active surface $A_3$ is the same size as the pressure-active surface $A_2$ on the valve head 27. On the end 37 thereof opposite the end 25, the valve piston 23 has a fourth pressure-active surface $A_4$, which surface $A_4$ is larger than that of the pressure-active surfaces $A_1$ to $A_3$, and which surface $A_4$ corresponds to the diameter of the valve piston 23. In addition, the surface $A_4$ is the same size as the surface $A_1$. A sealing element 64 formed as a soft seal is placed around the valve rod 29, and is placed, flush with the contour, in the valve head 27 at the end 33.

Figure 3:
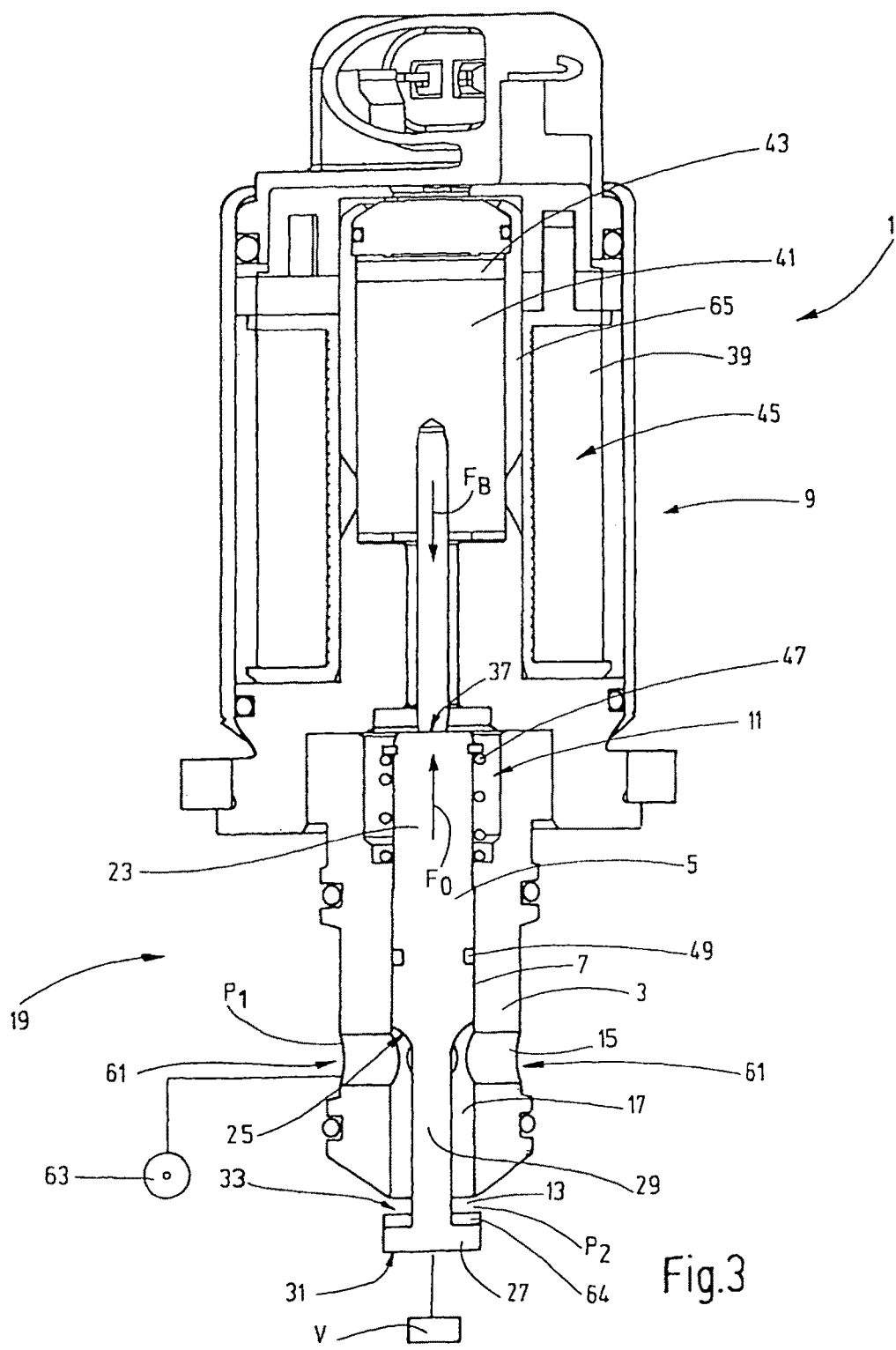
FIG. 3 is a schematic side view in section through a pneumatic valve, not to scale, according to a second exemplary embodiment of the invention.

As in all exemplary embodiments shown in FIGS. 1 to 3, the actuating device 9 is formed by an actuating magnet 39 and has an armature 41, which in is guided in an armature housing 43 in a longitudinally displaceable manner. The armature housing 43 is radially bounded by a thin-walled pole tube 65. An energizable solenoid device 45 forms the actuating magnet 39 and acts on the armature 41, upon the energizing thereof, counter to the reset force $F_O$ of the reset device 11 on the valve element 5. The reset is formed as a helical compression spring 47. In this case, the valve element 5 is moved from the closed position, in which the sealing element 64 closes the first media connection 13 in a sealing manner, into an open position shown in FIG. 1. At this point, additional details about the actuating device 9 will be foregone, since these details are already sufficiently known, in particular from the applicant's numerous prior applications.

The valve piston 23 of the valve element 5 is guided in the guide 7 of the valve housing 3 with a running tolerance such that a pressure equalization is achieved between the media connection 15 and the armature housing 43. Advantageously, the guide 7 can be sealed by a ring seal 49 (FIG. 3) so that the armature housing 43 in the valve housing 3 is maintained in the range of the ambient pressure and is pressure-sealed relative to the connection 15 and is pressure-tight in the region of the connection. In addition, advantageously, a venting duct (not shown) can be provided in the valve housing 3 or the valve piston 23, which connects the armature housing 43 to its environment, preferably with the ambient pressure.

FIG. 3 shows the armature housing 43 being connected to the ambient pressure. The valve element 5 is held at zero pressure in the guide 7. The reset device 11 and in particular the compression spring 47 must apply less reset force $F_O$. Accordingly, the valve device can have smaller dimensions. A valve device of that sort can also perform very fast switching and control processes.

Figure 4:
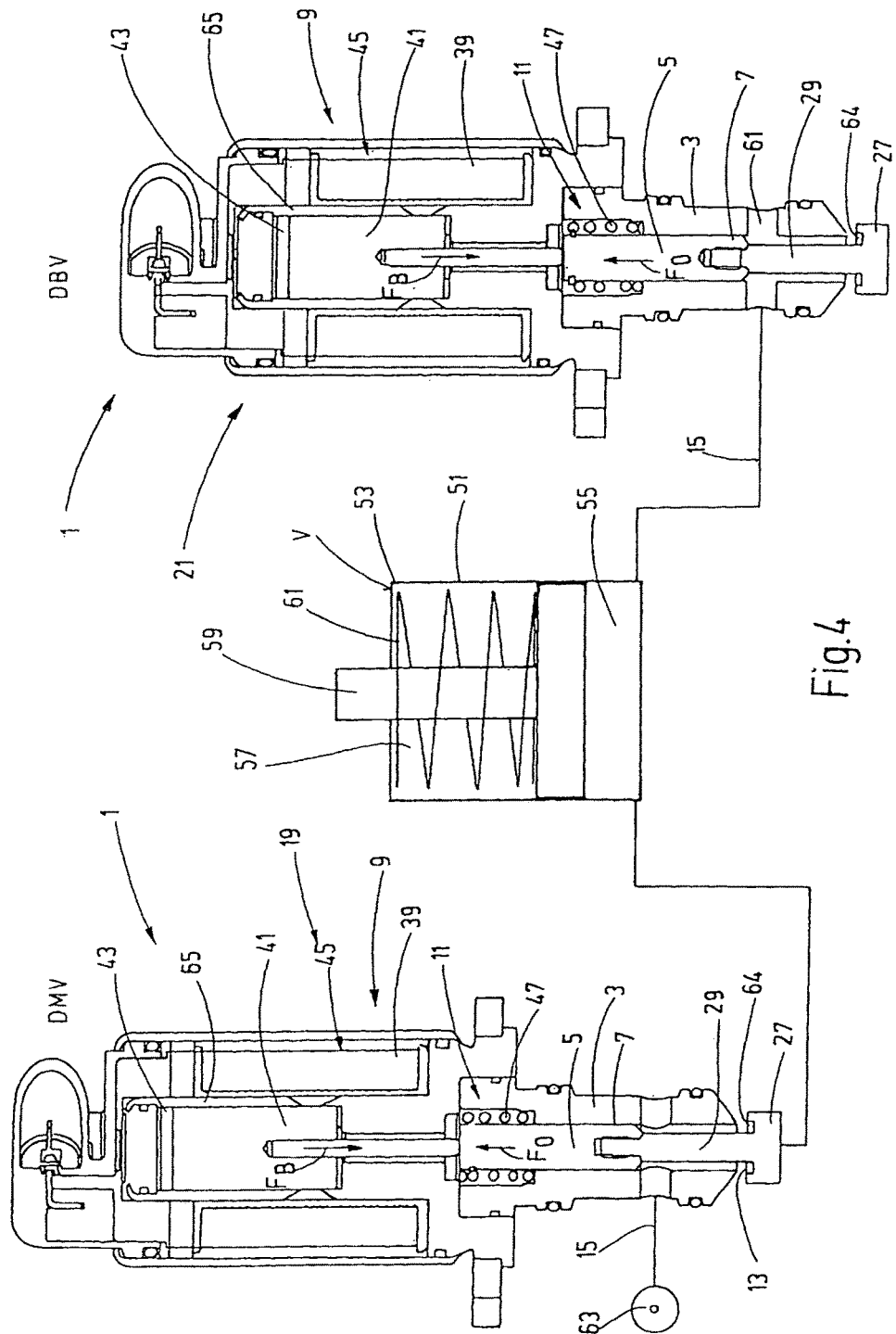
FIG. 4 is a schematic side view in section of a use of two pneumatic valves to control the pressure of a pneumatic medium on a device formed as a working cylinder, according to an exemplary embodiment of the invention.

FIG. 4 shows by way of example, a schematic functional representation of an application of the pneumatic valve 1 according to the invention. Each valve 1 is connected in a fluid-conducting manner using the same assembly. Once functioning as a pressure-reducing valve 19 and once functioning as a pressure relief valve 21 to regulate the pressure of a pneumatic medium in a device V. The device V has a pneumatic working cylinder 51 and the two media chambers 55, 57 located in a cylinder housing 53 and separated from one another by a piston-rod assembly 59. The pressure-reducing valve 19 shown on the left in FIG. 4 is connected in a fluid-conducting manner to the media chamber 55 at the piston end in the same way as the relief valve 21 shown on the right. A mechanical spring 61 is introduced as an additional reset device in the media chamber 57 on the rod side, as shown. A gas pressure spring or the like may be used in addition to, or may take the place of, the mechanical reset spring. In this way, pressure regulation for a hydraulic device V can be realized in a very cost effective and fail-safe manner using only one pneumatic valve 1 design. The working cylinder V could also include a bellows cylinder (not shown).

While various embodiments have been chosen to illustrate the invention, it will be understood by those skilled in the art that various changes and modifications can be made therein without departing from the scope of the invention as defined in the claims.

The invention claimed is:

1. A system for controlling pressure of a pneumatic medium, comprising:
   a pneumatically operated device; and
   a pressure-reducing valve and a pressure relief valve connected to said pneumatically operated device, each of said valves including:
   a valve housing with a guide, an actuating device and a reset device therein and having first and second media connections thereon, and
   a piston valve element axially displaceable in said guide and said valve housing under effects of said actuating device and said reset device, said reset device exerting a spring force on said piston valve element counter to a magnetic force applied to said piston valve element by said actuating device, said piston valve element establishing a media-conducting connection between said first and second media connections upon activation of said actuating device taking into account prevailing forces of applied pressures multiplied by respective pressure active surfaces on said piston valve element, the spring force, flow forces on said piston valve element and the magnetic force.

2. A system according to claim 1 wherein said pneumatically operated device comprises a pneumatic working cylinder having first and second media chambers located in a cylinder housing and separated by a piston-rod assembly, both of said pressure-reducing valve and said pressure relief valve being connected to said first media chamber.

3. A system according to claim 1 wherein each of said valves has said first media connection thereof with a lower pressure than said second media connection thereof with a higher pressure, said pressure-reducing valve regulating said first media connection thereof that is connected to said pneumatically operated device, said pressure relief valve regulating said second media connection thereof that is connected to said pneumatically operated device.

4. A system according to claim 1 wherein said piston valve element of each of said valves is held towards a closed position thereof by the spring force of said reset device according a formula, without taking friction into account, said formula being $$(p_1 \times A_1) - (p_2 \times A_2) + (p_2 \times A_3) - (p_2 \times A_4) + F_O = 0$$

where
$p_1$=pressure at said first media connection,
$p_1$=pressure at said second media connection,
$A_1, A_2, A_3, A_4$=areas of individual pressure-active surfaces of said piston valve element, and
$F_O$=the spring force of said reset device.

5. A system according to claim 4 wherein said piston valve element of each of said valves comprises a thickened cross section having a valve head at a free end thereof with a wider cross section than a remainder thereof, said valve head protruding from the respective valve housing and being connected to the remainder by a valve rod; and
each said valve has said pressure-active surfaces $A_1$ and $A_2$ on opposite ends of said valve head, respectively, in a region of said first media connection.

6. A system according to claim 5 wherein each said valve piston element has said pressure active surface $A_3$ on an end surface thereof facing said second media connection and having an area size that is the same as an area size of said pressure-active surface $A_2$; and
each said valve piston element has said pressure-active surface $A_4$ on an end thereof opposite said pressure-active surface $A_1$.

7. A system according to claim 1 wherein said piston valve element of each of said valves comprises a thickened cross section having a valve head at a free end thereof with a wider cross section than a remainder thereof, said valve head protruding from the respective valve housing and being connected to the remainder by a valve rod;

said first media connection of each said valve extends through the respective valve housing; and
each of said valves being closed currentless.

8. A system according to claim 7 wherein each said valve head has a pressure-active surface on each of two opposite ends of said valve head disposed in a region of said first media connection.

9. A system according to claim 1 wherein each said actuating device comprises an actuating magnet having an armature guided in an armature housing, said armature being longitudinally displaceable in said armature housing and being controlled by an energizable solenoid device that moves said piston valve element from a closed position to an open position counter to the spring force, said reset device including a compression spring.

10. A system according to claim 9 wherein each said piston valve element comprises a valve piston guided in said guide of said valve housing with a running tolerance producing a pressure equalization between the respective first and second media connections and said armature housing.

11. A system according to claim 9 wherein each said guide is airtight; and
each said armature housing is maintained at an ambient pressure and is pressure-tight relative to surroundings thereof.

12. A system according to claim 9 wherein each said valve piston element is guided in the respective valve housing in an air-tight manner; and
each said armature housing is equalized to ambient pressure.

13. A pneumatic valve for providing a pressure-reducing valve or a pressure relief valve to be connected to a pneumatically operated device, comprising:
a valve housing with a guide, an actuating device and a reset device therein and having first and second media connections thereon; and
a piston valve element axially displaceable in said guide and said valve housing under effects of said actuating device and said reset device, said reset device exerting a spring force on said piston valve element counter to a magnetic force applied to said piston valve element by said actuating device, said piston valve element establishing a media-conducting connection between said first and second media connections upon activation of said actuating device taking into account prevailing forces of applied pressures multiplied by respective pressure active surfaces on said piston valve element, the spring force, flow forces on said piston valve element and the magnetic force;
said actuating device including an actuating magnet having an armature guided in an armature housing, said armature being longitudinally displaceable in said armature housing and being controlled by an energizable solenoid device that moves said piston valve element from a closed position to an open position counter to the spring force, said reset device including a compression spring;
said guide of said valve piston element being airtight; and
said armature housing being maintained at an ambient pressure and is pressure-tight relative to surroundings thereof.

14. A pneumatic valve according to claim 13 wherein said first media connection thereof has a lower pressure than said second media connection thereof with a higher pressure.

15. A pneumatic valve according to claim 13 wherein
said piston valve element comprises a thickened cross section having a valve head at a free end thereof with a wider cross section than a remainder thereof, said valve head protruding from said respective valve housing and being connected to the remainder by a valve rod;
said first media connection extends through said valve housing; and
said valve being closed currentless.

16. A pneumatic valve according to claim 15 wherein
said valve head has a pressure-active surface on each of two opposite ends of said valve head disposed in a region of said first media connection.

17. A pneumatic valve according to claim 16 wherein
said piston valve element is held towards a closed position thereof by the spring force of said reset device according a formula, without taking friction into account, said formula being $$(p_1 \times A_1) - (p_2 \times A_2) + (p_2 \times A_3) - (p_2 \times A_4) + F_O = 0$$

where
$p_1$=pressure at said first media connection,
$P_2$=pressure at said second media connection,
$A_1, A_2, A_3, A_4$=areas of individual pressure-active surfaces of said piston valve element, and
$F_O$=the spring force of said reset device.

18. A pneumatic valve according to claim 17 wherein
said piston valve element comprises a thickened cross section having a valve head at a free end thereof with a wider cross section than a remainder thereof, said valve head protruding from said respective valve housing and being connected to the remainder by a valve rod;
said valve has said pressure-active surfaces $A_1$ and $A_2$ on opposite ends of said valve head, respectively, in a region of said first media connection.

19. A pneumatic valve according to claim 18 wherein
said valve piston element has said pressure active surface $A_3$ on an end surface thereof facing said second media connection and having an area size that is the same as an area size of said pressure-active surface $A_2$; and
said valve piston element has said pressure-active surface $A_4$ on an end thereof opposite said pressure-active surface $A_1$.

20. A pneumatic valve according to claim 13 wherein
said piston valve element comprises a valve piston guided in said guide of said valve housing with a running tolerance producing a pressure equalization between the respective first and second media connections and said armature housing.

21. A pneumatic valve according to claim 13 wherein
said valve piston element is guided in the respective valve housing in an air-tight manner; and
said armature housing is equalized to ambient pressure.

* * * * *